(12) United States Patent
Hirahara et al.

(10) Patent No.: US 9,809,499 B2
(45) Date of Patent: Nov. 7, 2017

(54) DIELECTRIC MATERIAL AND ELECTRONIC COMPONENT

(71) Applicant: KYOCERA Corporation, Kyoto-shi, Kyoto (JP)

(72) Inventors: Seiichirou Hirahara, Kirishima (JP); Youji Seki, Kagoshima (JP); Tomoyuki Ono, Kirishima (JP); Fumito Furuuchi, Kagoshima (JP); Maiko Nagayoshi, Kirishima (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 15/317,163

(22) PCT Filed: Jul. 3, 2015

(86) PCT No.: PCT/JP2015/069268
§ 371 (c)(1),
(2) Date: Dec. 8, 2016

(87) PCT Pub. No.: WO2016/002929
PCT Pub. Date: Jan. 7, 2016

(65) Prior Publication Data
US 2017/0101344 A1  Apr. 13, 2017

(30) Foreign Application Priority Data
Jul. 3, 2014 (JP) .................................. 2014-137799

(51) Int. Cl.
*C04B 35/46* (2006.01)
*H01G 4/12* (2006.01)
(Continued)

(52) U.S. Cl.
CPC .......... *C04B 35/465* (2013.01); *C04B 35/462* (2013.01); *H01G 4/1218* (2013.01);
(Continued)

(58) Field of Classification Search
CPC .............................. C04B 35/46; H01G 4/1218
See application file for complete search history.

(56) References Cited

U.S. PATENT DOCUMENTS 8,217,256 B2 * 7/2012 Uchida .................. C01G 31/00
136/239
8,644,000 B2 * 2/2014 Dogan .................... H01G 4/30
361/301.2

(Continued)

OTHER PUBLICATIONS

M Li, A Feteira, D.C. Sinclair and A.R. West, Applied Physics Letters 88, 232903 (2006), Jun. 7, 2006, 4 pgs.

*Primary Examiner* — Karl Group
(74) *Attorney, Agent, or Firm* — Vople and Koenig, P.C.

(57) ABSTRACT

A dielectric material having a rutile crystalline structure includes Ti as a major constituent metal element, and, as metal elements other than Ti, a metal element M1 which includes at least one selected from among Ni, Co, and elements belonging to Group 2 according to a periodic table, and a metal element M2 which includes at least one selected from among elements belonging to Group 5 and Group 6 in the periodic table, and, on a basis of a total amount of Ti, the metal element M1, and the metal element M2, a molar ratio x of the metal element M1 is in a range of 0.005 to 0.025 and a molar ratio y of the metal element M2 is in a range of 0.010 to 0.050.

10 Claims, 4 Drawing Sheets

(51) Int. Cl.
   *C04B 35/465* (2006.01)
   *C04B 35/462* (2006.01)
   *H01G 4/30* (2006.01)

(52) U.S. Cl.
   CPC ............ *H01G 4/1227* (2013.01); *H01G 4/30* (2013.01); *C04B 2235/326* (2013.01); *C04B 2235/3206* (2013.01); *C04B 2235/3208* (2013.01); *C04B 2235/3234* (2013.01); *C04B 2235/3236* (2013.01); *C04B 2235/3255* (2013.01); *C04B 2235/3275* (2013.01); *C04B 2235/3279* (2013.01)

(56) References Cited

U.S. PATENT DOCUMENTS

| | | | |
|---|---|---|---|
| 9,227,876 B2* | 1/2016 | Hu | C01G 23/002 |
| 2014/0293506 A1* | 10/2014 | Hu | C01G 23/002 361/311 |

* cited by examiner (a) No.14

(b) No.21

DIELECTRIC MATERIAL AND ELECTRONIC COMPONENT

TECHNICAL FIELD

The present invention relates to a dielectric material and an electronic component.

BACKGROUND ART

Heretofore it has been customary to use a dielectric material containing barium titanate as dielectric ceramics for an electronic component such as a multi-layer ceramic capacitor. The multi-layer ceramic capacitor includes a stack of dielectric layers made of dielectric ceramics and conductor layers which are alternately laminated, and, downsizing and an increase in capacity have been achieved by reducing the thickness of the dielectric layer. While the level of downsizing and capacity increase, the reduction of the layer thickness of the dielectric layer leads to an increase in the intensity of an electric field applied to the dielectric layer, with consequent difficulties in ensuring reliability in, for example, dielectric strength and lifetime under a high temperature load. Another problem is that, due to a decrease in crystal grain size in the dielectric layer entailed by the reduction of its layer thickness, the relative permittivity of the dielectric layer is lowered, with consequent difficulties in attaining advantageous effects of increased capacity by the reduction of the layer thickness of the dielectric layer.

In recent years, studies have been made as to a dielectric ceramic material which exhibits high relative permittivity sufficient to obtain high capacitance even when the thickness of the dielectric layer is increased to an extent that would ensure reliability. For example, $CaCu_3Ti_4O_{12}$ (CCTO) has been proposed to date (refer to Non Patent Literature 1, for example).

CITATION LIST

Non Patent Literature

Non Patent Literature 1: M Li, A Feteira, D. C. Sinclair and A. R. West, Applied Physics Letters 88, 232903 (2006)

SUMMARY OF INVENTION

Technical Problem

However, in the CCTO mentioned above, there is a problem that its relative permittivity tends to vary with frequency and temperature changes in a variation range of the order of several hundred to several tens of thousands.

An object of the invention is to provide a dielectric material which is high in relative permittivity and yet low in dependence of dielectric characteristics on frequency and on temperature, and an electronic component.

Solution to Problem

A dielectric material according to an embodiment of the invention is a dielectric material having a rutile crystalline structure, including Ti as a major constituent metal element; and as metal elements other than Ti, a metal element M1 which includes at least one selected from among Ni, Co, and elements belonging to Group 2 according to a periodic table, and a metal element M2 which includes at least one selected from among elements belonging to Group 5 and Group 6 in the periodic table, and, on a basis of a total amount of Ti, the metal element M1, and the metal element M2, a molar ratio x of the metal element M1 is in a range of 0.005 to 0.025 and a molar ratio y of the metal element M2 is in a range of 0.010 to 0.050.

Moreover, an electronic component according to an embodiment of the invention includes a dielectric layer and a pair of conductor layers which are opposed to each other with the dielectric layer interposed in between, and the dielectric layer is formed of the dielectric material mentioned above.

Advantageous Effects of Invention

According to the invention, it is possible to provide the dielectric material which is high in relative permittivity and yet low in dependence of dielectric characteristics on frequency and on temperature, and the electronic component.

BRIEF DESCRIPTION OF DRAWINGS

FIG. 4(a) represents the result of measurement on Sample No. 14, and FIG. 4(b) represents the result of measurement on Sample No. 21.

DESCRIPTION OF EMBODIMENTS

The following describes specific embodiments of a dielectric material and an electronic component.

Figure 1:
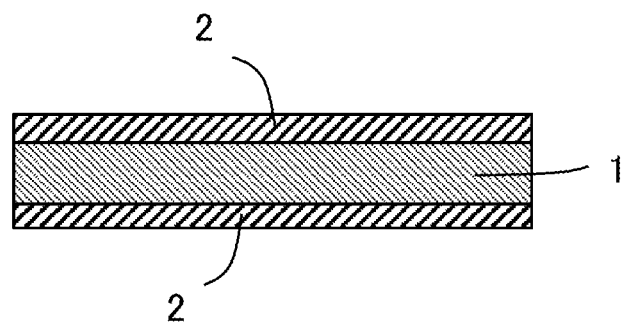
FIG. 1 is a sectional view schematically showing an electronic component in accordance with a first embodiment.

As shown in FIG. 1, the electronic component in accordance with the first embodiment comprises a dielectric layer 1 and a pair of conductor layers 2 facing each other with the dielectric layer 1 interposed in between. In this embodiment, the dielectric layer 1 is made of a dielectric material which contains Ti as a major constituent metal element, and has a rutile crystalline structure.

The dielectric material contains, as metal elements other than Ti, a metal element M1 which is at least one selected from among Ni, Co, and the elements belonging to Group 2 according to the periodic table, and a metal element M2 which is at least one selected from among the elements belonging to Group 5 and Group 6 in the periodic table. In terms of M1 and M2 contents, on the basis of the total amount of Ti, M1, and M2, a molar ratio x of M1 is in a range of 0.005 to 0.025, and a molar ratio y of M2 is in a range of 0.010 to 0.050.

In the dielectric material having a rutile crystalline structure containing M1 and M2 within the above-described ranges, a relative permittivity of greater than or equal to 1000 is obtained at 1 kHz under a room-temperature (25° C.) condition, and a dielectric loss is less than or equal to 0.5, and also the extent of variation in relative permittivity at frequencies ranging from 1 Hz to $1 \times 10^6$ Hz (dependence of relative permittivity on frequency) is small. The condition where the extent of variation in relative permittivity at frequencies ranging from 1 Hz to $1\times10^6$ Hz is small means that, when the relative permittivity at 1 kHz is 1, the maximum value and the minimum value of the relative permittivity at frequencies ranging from 1 Hz to $1\times10^6$ Hz fall in a range of 0.3 to 3.0, especially in a range of 0.6 to 2.0. Moreover, the dielectric material in this embodiment, being possessed of paraelectric property, is low in temperature dependence of relative permittivity.

The dielectric material in this embodiment is composed of a titanium oxide crystal with the above-described metal elements M1 (at least one selected from among Ni, Co, and the elements belonging to Group 2 in the periodic table) and M2 (at least one selected from among the elements belonging to Group 5 and Group 6 in the periodic table) added in the form of solid solution in predetermined proportions. The dielectric material containing the elements M1 and M2 in the form of solid solution, while being subjected to a slight change in lattice constants a and c in the rutile crystalline structure of titanium oxide, has still the rutile crystalline structure, and is substantially free of other crystalline phase such as an anatase crystalline structure.

That is, the dielectric material has a crystalline phase of rutile titanium oxide, and is substantially free of other crystalline phase such as the anatase crystalline structure. The condition where the dielectric material is substantially free of other crystalline phase means that the presence of the rutile crystalline structure has been confirmed, but the presence of a diffraction peak ascribable to other crystalline phase cannot be confirmed, on the basis of the X-ray diffraction (XRD) pattern of the dielectric material. It is thus preferable that the crystalline phase of the dielectric material is defined by the rutile crystalline structure.

Although it is not clear why such a dielectric material develops high relative permittivity, probably the reason is that, for example, a polarized structure based on Ti displacement is formed within the rutile crystalline structure, or part of Ti turns $Ti^{3+}$ which involves oxygen defect. Even in such a state, as will be apparent from specific examples that will hereafter be described, the dielectric material in this embodiment is characterized by the dominance of paraelectric property.

Moreover, in normal rutile titanium oxide, in a cathode luminescence spectrum, a peak appears at wavelengths in the vicinity of 500 nm, as well as at wavelengths in the vicinity of 800 nm, and, a peak of higher intensity appears at wavelengths in the vicinity of 800 nm (refer to FIG. 4(b)). On the other hand, in the dielectric material in this embodiment, the intensity of a peak which appears at wavelengths in the vicinity of 800 nm is low, and more specifically, it is lower than the intensity of a peak which appears at wavelengths in the vicinity of 500 nm, or, in most cases, no peak is identified at wavelengths in the vicinity of 800 nm (refer to FIG. 4(a)). In the dielectric material in this embodiment, given that, in a cathode luminescence spectrum, the intensity of a peak which appears at wavelengths ranging from 400 nm to 600 nm is I1 and the intensity of a peak which appears at wavelengths ranging from 700 nm to 1000 nm is I2, then I1 is greater than I2.

In a case where those peaks coincide with each other, I1 and I2 are preferably evaluated under peak separation. However, if the degree of coincidence is not so high, or the difference in intensity between the peaks is appreciable, direct comparison may be performed after effecting, for example, background removal operation within reason.

The dielectric material in this embodiment is expressed in compositional formula form as: $M1_xM2_yTi_{1-x-y}O_{2+\alpha}$; wherein M1 represents at least one selected from among Ni, Co, and the elements belonging to Group 2 in the periodic table, and M2 represents at least one selected from among the elements belonging to Group 5 and Group 6 in the periodic table. In the compositional formula, x and y indicative of high relative permittivity fulfill the above-described ranges given as: $0.005 \leq x \leq 0.025$ and $0.010 \leq y \leq 0.050$, respectively, and, the value of y is about twice the value of x. When y differs greatly from a value which is twice x, the rutile crystalline structure may not be maintained, or a different phase may appear. Note that α represents variation in oxygen quantity from a stoichiometric composition caused by variation in the quantity of oxygen contained in the dielectric material or in the valence of titanium (Ti).

Especially in cases where M1 is at least one of Mg, Ni, and Co and M2 is at least one of Nb and Ta, and x and y fulfil ranges given as: $0.008 \leq x \leq 0.0018$ and $0.016 \leq y \leq 0.036$, respectively, a relative permittivity of greater than or equal to 2000 can be obtained at 1 kHz under a room-temperature (25° C.) condition. In a case where M1 is at least one of Mg and Ni, a dielectric loss can be reduced to a level of less than or equal to 1.0 even at a frequency of 1 MHz ($1\times10^6$ Hz).

Moreover, also in cases where M1 is Ca and M2 is W, by setting x and y so as to fulfill ranges given as: $0.008 \leq x \leq 0.018$ and $0.016 \leq y \leq 0.036$, respectively, it is possible to obtain a relative permittivity of greater than or equal to 2000 at 1 kHz ($1\times10^3$ Hz) under a room-temperature (25° C.) condition.

It is preferable that the dielectric material in this embodiment is of a dense nature having a porosity of less than or equal to 5%, or more desirably less than or equal to 2%. In the densely-structured dielectric material having a porosity of less than or equal to 5%, a dielectric loss can be reduced to a level of less than or equal to 0.5 at 1 kHz ($1\times10^3$ Hz) under a room-temperature (25° C.) condition. The porosity of the dielectric material is confirmed by performing graphic analyses on a photograph of the section of the dielectric material taken by a scanning electron microscope (SEM). A magnification thereof is set to 1000 to 5000-fold magnification, for example.

For example, the dielectric material may be used in the form of a thin film or ceramic sintered body. In the case of a ceramic sintered body, it is preferable that the dielectric material has an average particle size of 1 to 10 μm. Also in the case where the dielectric material has the form of a thin film or ceramic sintered body, its crystalline phase is preferably defined by the rutile crystalline structure.

The following describes a method for producing a ceramic sintered body by way of an example of methods for producing such a dielectric material.

A powder mixture is prepared by blending predetermined amounts of oxide or carbonate of M1 (at least one selected from among Ni, Co, and the elements belonging to Group 2 in the periodic table), for example, powder of NiO, CoO, $Co_2O_3$, $Co_3O_4$, MgO, $MgCO_3$, CaO, or $CaCO_3$, and oxide of M2 (at least one selected from among the elements belonging to Group 5 and Group 6 in the periodic table), for example, powder of $Nb_2O_5$, $Ta_2O_5$, or $WO_3$, into powder of titanium oxide. A binder is added to the powder mixture, and, the admixture is molded into a predetermined shape. A method for the molding is suitably selected from among heretofore known molding techniques such as press molding or sheet molding.

In the case of sheet molding, for example, a solution mixture for molding is obtained by mixing the powder mixture with a solvent, a dispersant, and a binder. As the solvent, use can be made of an organic solvent such for example as ethanol, alcohols including isopropyl alcohol (IPA), or toluene. As the binder, use can be made of an organic resin such for example as polyvinyl alcohol resin, polyvinyl butyral resin, or acrylic resin. The solution mixture so obtained is molded into a sheet form by a heretofore known sheet molding technique such as doctor blade method or coater method, to obtain a molded body.

The molded body so obtained is subjected to suitable binder removal treatment, and is heated at a temperature elevating rate of 1 to 5° C./min and fired in an aerial atmosphere at temperatures ranging from 1200 to 1400° C. for 4 to 10 hours. In this way, the dielectric material in this embodiment is obtained. On an as needed basis, the powder mixture or the molded body may be calcined in an aerial atmosphere at temperatures ranging from 800 to 1000° C. for 2 to 10 hours. In this case, as to the powder mixture, after being calcined into calcined powder, it is molded into a predetermined shape with the addition of a binder and so forth, and is then fired under the above-described conditions. As to the molded body, after being calcined under the above-described calcining conditions, it is fired under the above-described firing conditions.

It is preferable that the molded body is placed on a setter such as a zirconia setter, is housed in a ceramic-made sagger, and is fired. As the material of construction of the sagger, for example, alumina, magnesia, or mullite may be used.

Moreover, when the sheet molded body is fired, a low-reactive substrate, for example, a zirconia substrate, may be placed on the sheet molded body which has been subjected to the binder removal treatment.

The dielectric material thus obtained may be used for a capacitor, a resonator, a high-frequency IC substrate, a dielectric optical device, and so forth without being subjected to work operation, or after worked into a suitable form of suitable size on an as needed basis. This embodiment affords excellent performance capability especially when applied to a compact capacitor of high capacity.

Figure 2:
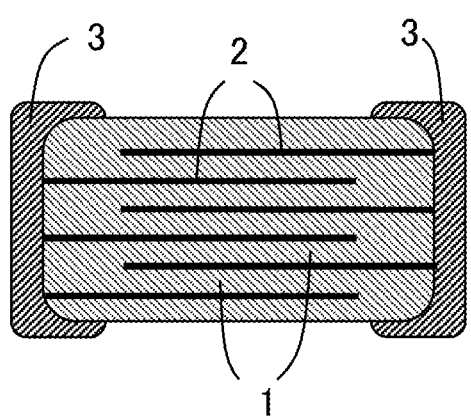
FIG. 2 is a sectional view schematically showing an electronic component in accordance with a second embodiment.

As shown in FIG. 2, the electronic component in accordance with the second embodiment comprises a stack of a plurality of dielectric layers 1 made of the dielectric material described above and conductor layers 2 which are alternately laminated, and also comprises, for example, an external electrode 3 which connects together the individual conductor layers 2 exposed at a side face extending along a direction in which the dielectric layers 1 and the conductor layers 2 are laminated.

In this embodiment, it is preferable that the dielectric layer 1 has a thickness of 3 to 20 μm. With the dielectric layer 1 having a thickness of 3 to 20 μm, it is possible to constitute an electronic component having practical use with a multi-layer ceramic capacitor, for example.

In each of the first embodiment and the second embodiment, the conductor layer 2 may be made of any given material which has electrical conductivity. For example, Au, Ag, Pd, Pt, Cu, Al, Ni, and an alloy of such metals may be used. Specific examples of the material of construction of the conductor layer 2 include Ag—Pd alloy foil, copper foil, and a vapor-deposited film. In general, the conductor layer 2 has a thickness of 0.5 to 5 μm, or preferably a thickness of 1 to 4 μm.

Examples

First, raw material powders of titanium oxide, magnesium carbonate, calcium carbonate, nickel oxide, cobalt oxide, niobium oxide, tantalum oxide, and tungsten oxide were prepared, and these raw material powders were blended so as to become compositions presented in Table 1. Isopropyl alcohol (IPA) was added to each raw material powder blend and the admixture was subjected to wet mixing process using a ball mill for 12 hours to prepare a slurry. Next, a paraffin wax was added to the slurry thus prepared in an amount of 5% by mass on the basis of the amount of the raw material powders, was dried into granules. The granules was molded into a molded body in the form of a circular plate which is 15 mm in diameter and 1.3 mm in thickness by mold pressing.

Next, the molded body thus formed was placed on a zirconia-made setter and housed in a magnesia-made sagger, and the sagger covered with a lid was fired in an aerial atmosphere at 1350° C. under retention time of 10 hours. A sintered body was thus obtained as a dielectric material. The rate of temperature elevation for the firing process was set at 2° C./min.

The composition of the sintered body so obtained was confirmed by the high-frequency inductively coupled plasma (ICP) emission spectrometry. The result of analysis showed that the composition of the sintered body substantially coincides with the composition of the corresponding blend, with the variation held within the analytical limit of tolerances. Moreover, the sintered body was subjected to X-ray diffraction (XRD) measurement to obtain an XRD pattern. As the result of crystal phase identification based on the XRD pattern, each sintered body had a rutile crystalline structure, and showed no sign of a diffraction peak ascribable to other crystalline phase.

The porosity of the sintered body was confirmed by performing graphic analyses on a photograph of the section of the sintered body taken by a scanning electron microscope (SEM). A magnification of the SEM photograph was set to 2000-fold magnification. The result of measurement showed that the porosity of each sintered body is less than or equal to 2%.

The electrical characteristics of the sintered body were measured as follows. A Au electrode which was 1 cm in diameter was formed on each of the front and back sides of the sintered body by an ion sputtering apparatus (JEOL-JFC-1500).

In each sample formed with the Au electrode, a real part Z' and an imaginary part Z" of impedance were measured. An impedance measurement apparatus manufactured by Solartron Corporation was used for measurement at frequencies ranging from 0.01 Hz to 10 MHz ($1\times10^{-2}$ Hz to $1\times10^{7}$ Hz), and, an impedance measurement apparatus manufactured by Agilent Corporation (Model 4295A) was used for measurement at frequencies ranging from 40 Hz to 110 MHz (40 Hz to $1.1\times10^{8}$ Hz). In the measurement, AC voltage having an effective voltage of 500 mV (Bias 0 V) was applied.

On the basis of the measured real part Z' and imaginary part Z", capacitance Cp (F) was calculated, and also a relative permittivity $\in_r$ was calculated. The capacitance Cp was calculated using the formula of $Cp=Z''/(2\pi f(Z'^2+Z''^2))$ (wherein f represents frequency). Moreover, the relative permittivity $\in_r$ was calculated using the formula of $\in_r=Cp\times d/(\in_0 \times S)$ under a condition where the formula of $Cp=\in_0\in_r\times S/d$ (wherein $\in_0$ represents a dielectric constant in a vacuum, S represents the area of electrode, and d represents the thickness of the sintered body) holds throughout the frequency range.

The hysteresis characteristics of dielectric polarization in the sintered body were measured using a ferroelectric characteristic evaluation apparatus (manufactured by TOYO Corporation).

Table 1 shows the evaluation results on the individual samples. Note that variation in relative permittivity with respect to frequency was evaluated on the basis of the ratio of each of the maximum value ($\epsilon_{rmax}$) and the minimum value ($\epsilon_{rmim}$) of the relative permittivity at frequencies ranging from 1 Hz to $1\times10^6$ Hz to the relative permittivity at a frequency of 1 kHz ($1\times10^3$ Hz) ($\epsilon_{rmax}/\epsilon_r$ (1 kHz) and $\epsilon_{rmin}/\epsilon_r$ (1 kHz)).

TABLE 1

| Sample No. | M1 | M2 | x | y | Ti | $\epsilon_r$ 1 kHz | tanδ 1 kHz |
|---|---|---|---|---|---|---|---|
| 1 | Mg | Nb | 0.005 | 0.010 | 0.985 | 1,090 | 0.029 |
| 2 | Mg | Nb | 0.008 | 0.015 | 0.978 | 2,660 | 0.008 |
| 3 | Mg | Nb | 0.010 | 0.020 | 0.970 | 2,240 | 0.009 |
| 4 | Mg | Nb | 0.013 | 0.025 | 0.962 | 5,620 | 0.029 |
| 5 | Mg | Nb | 0.015 | 0.030 | 0.955 | 3,070 | 0.008 |
| 6 | Mg | Nb | 0.018 | 0.035 | 0.947 | 2,530 | 0.007 |
| 7 | Mg | Nb | 0.020 | 0.040 | 0.940 | 1,980 | 0.013 |
| 8 | Mg | Nb | 0.025 | 0.050 | 0.925 | 1,110 | 0.020 |
| 9 | Mg | Ta | 0.001 | 0.002 | 0.997 | 315 | 0.192 |
| 10 | Mg | Ta | 0.003 | 0.006 | 0.991 | 772 | 0.269 |
| 11 | Mg | Ta | 0.005 | 0.010 | 0.985 | 1,160 | 0.077 |
| 12 | Mg | Ta | 0.006 | 0.012 | 0.982 | 1,520 | 0.022 |
| 13 | Mg | Ta | 0.008 | 0.016 | 0.976 | 2,220 | 0.039 |
| 14 | Mg | Ta | 0.010 | 0.020 | 0.970 | 2,440 | 0.015 |
| 15 | Mg | Ta | 0.013 | 0.025 | 0.962 | 7,080 | 0.045 |
| 16 | Mg | Ta | 0.015 | 0.030 | 0.955 | 2,440 | 0.030 |
| 17 | Mg | Ta | 0.018 | 0.035 | 0.947 | 2,530 | 0.011 |
| 18 | Mg | Ta | 0.020 | 0.040 | 0.940 | 1,940 | 0.014 |
| 19 | Mg | Ta | 0.025 | 0.050 | 0.925 | 1,050 | 0.020 |
| 20 | Mg | Ta | 0.030 | 0.060 | 0.910 | 762 | 0.023 |
| 21 | Mg | Ta | 0.040 | 0.080 | 0.880 | 852 | 0.014 |
| 22 | Ni | Ta | 0.010 | 0.020 | 0.970 | 55,300 | 0.275 |
| 23 | Co | Ta | 0.010 | 0.020 | 0.970 | 75,600 | 0.296 |
| 24 | Ca | W | 0.013 | 0.025 | 0.962 | 3,870 | 0.404 |

*Header formula: $M1_x M2_y Ti_{1-x-y} O_{2+\alpha}$*

*α represents variation of oxygen quantity

In each of Samples No. 9 and No. 10 in which the molar ratio x of M1 is less than 0.005 and the molar ratio y of M2 is less than 0.010, the relative permittivity at 1 kHz under a room-temperature condition takes on a small value below 1000 (in what follows, values obtained at 1 kHz under a room-temperature condition will define dielectric characteristics unless otherwise specified). Likewise, in each of Samples No. 20 and No. 21 in which the molar ratio x of M1 is greater than 0.025 and the molar ratio y of M2 is greater than 0.050, the relative permittivity takes on a small value below 1000.

Figure 3:
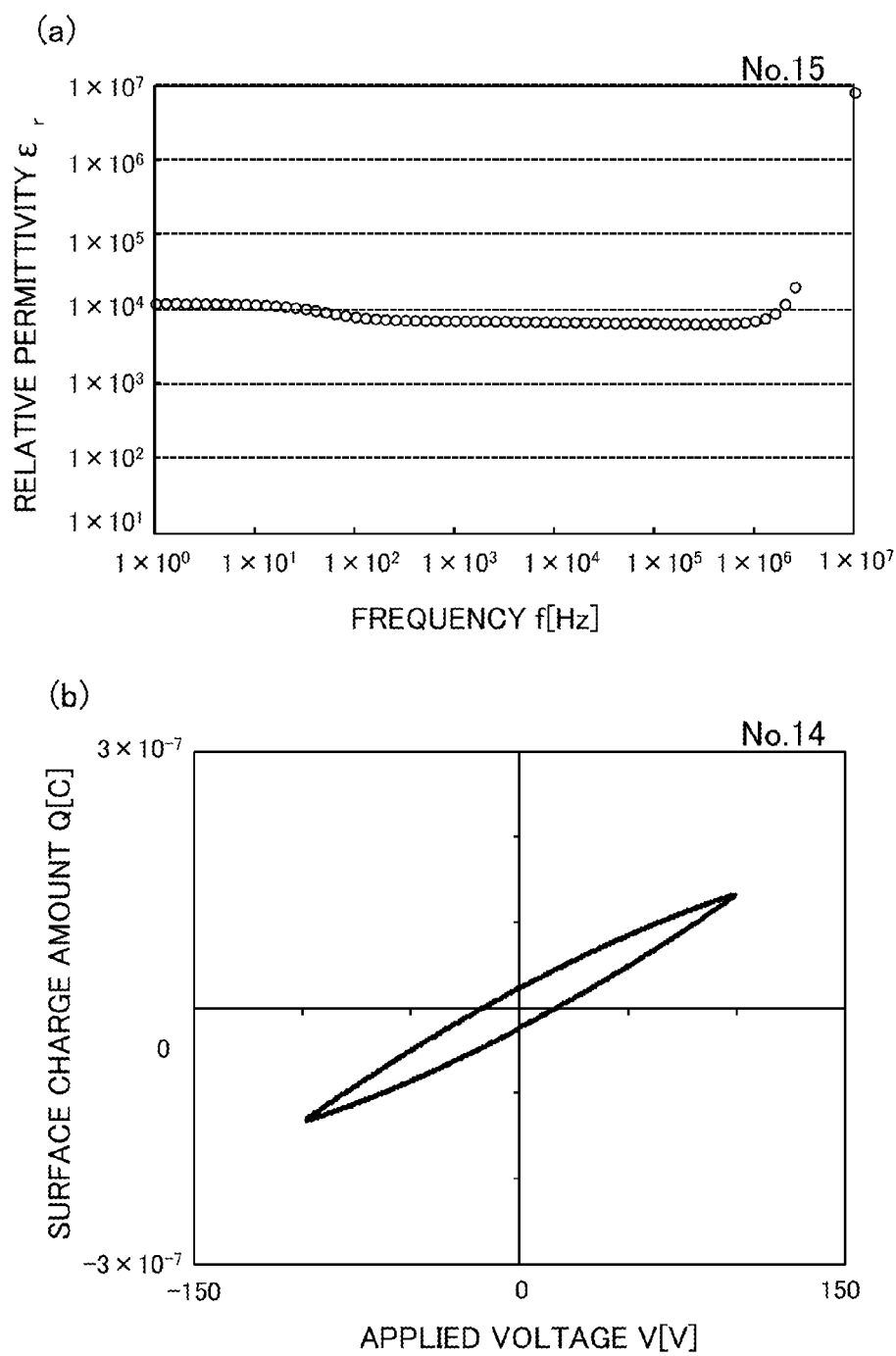
FIG. 3(a) is a graph showing the dependence of relative permittivity on frequency in Sample No. 15 serving as an example.
FIG. 3(b) is a graph showing a hysteresis curve of dielectric polarization in Sample 14 serving as an example.

The result of measurement on Sample No. 15 (M1: Mg, M2: Ta, x=0.013, and y=0.025) is shown in FIG. 3(a) by way of example for illustrating the dependence of relative permittivity on frequency. Within the range of frequencies extending from 1 Hz to $1\times10^6$ Hz, on the basis of the relative permittivity at 1 kHz defined as the reference, the maximum value $\epsilon_{rmax}$ and the minimum value $\epsilon_{rmim}$ of the relative permittivity are as relatively small as 1.7 and 0.9, respectively. Also in other samples, within the range of the molar ratio x of M1 extending from 0.005 to 0.025 and within the range of the molar ratio y of M2 extending from 0.010 to 0.050, on the basis of the relative permittivity at 1 kHz defined as the reference, each of $\epsilon_{rmax}$ and $\epsilon_{rmim}$ falls in the range of 0.3 to 3.0.

On the other hand, in each of Samples No. 9 and No. 10 in which the molar ratio x of M1 is less than 0.005 and the molar ratio y of M2 is less than 0.010, $\epsilon_{rmax}$ is greater than or equal to 3.5 within the range of frequencies extending from 1 Hz to $1\times10^6$ Hz. That is, the extent of variation in relative permittivity with respect to frequency was large.

Meanwhile, in each of Samples No. 20 and No. 21 in which the molar ratio x of M1 is greater than 0.025 and the molar ratio y of M2 is greater than 0.050, on the basis of the relative permittivity at 1 kHz defined as the reference, each of $\epsilon_{rmax}$ and $\epsilon_{rmim}$ falls in the range of 0.9 to 1.4. That is, the extent of variation in relative permittivity was small.

In FIG. 3(b), there is shown the result of measurement of the hysteresis characteristics of dielectric polarization in Sample 14 (M1: Mg, M2: Ta, x=0.010, and y=0.020). The profile in the chart indicates the dominance of paraelectric property. The result of measurement on each of other samples has similarly showed the dominance of paraelectric property.

Cathode luminescence measurement in the sintered body has been conducted with use of a scanning electron microscope (SEM) (JSM-7001F manufactured by JEOL Ltd.) installed with a cathode luminescence measurement system MP-32S (diffraction grating: 100 gr/mm, blaze wavelength: 450 nm, detector: CCD) manufactured by HORIBA, Ltd. The conditions for the measurement were slit width of 100 μm, accelerating voltage of 15 kV, and measurement area of about 30×30 μm. Moreover, a sample under measurement was subjected to surface grinding using #2000 abrasive paper and subsequent mirror finish using a diamond paste.

Figure 4:
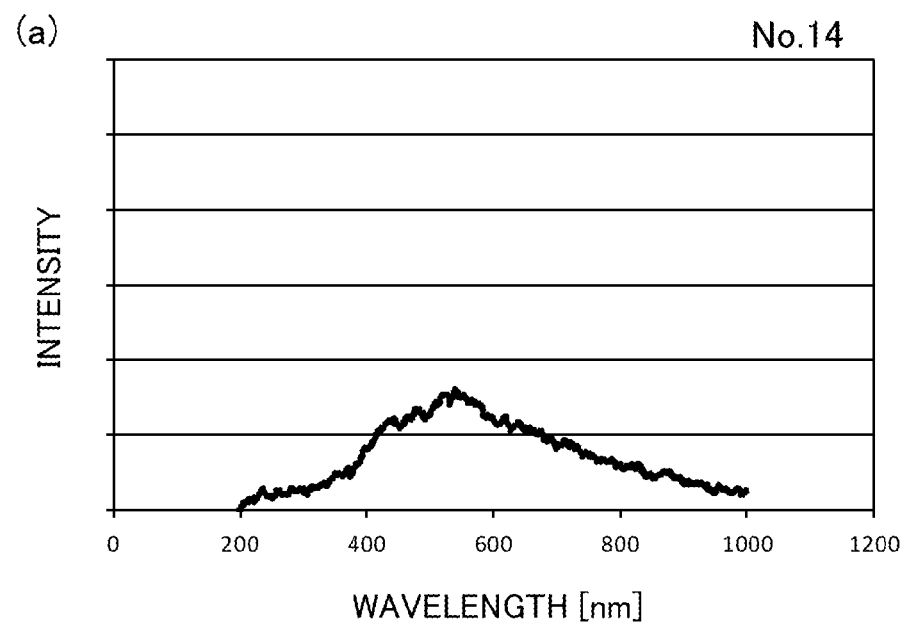
FIG. 4 is a graph showing spectra as observed in cathode luminescence measurement in examples, and more specifically
Figure 4:
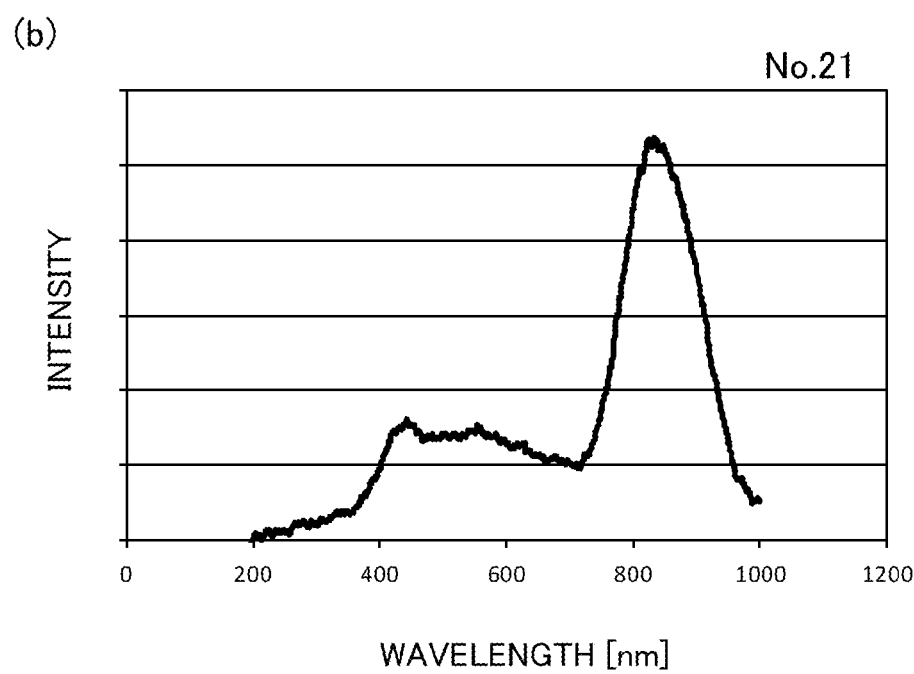

In FIG. 4, there are shown spectra as observed in cathode luminescence measurement, and more specifically FIG. 4(a) represents the result of measurement on Sample No. 14, and FIG. 4(b) represents the result of measurement on Sample No. 21 (M1: Mg, M2: Ta, x=0.040, and y=0.080). According to FIG. 4(a), a peak appeared at wavelengths ranging from 400 to 600 nm, but no peak appeared at wavelengths ranging from 700 to 1000 nm. On the other hand, according to FIG. 4(b), at wavelengths in the vicinity of 830 nm, there is a peak which is higher in intensity than the peak which appeared at wavelengths ranging from 400 to 600 nm. Also in Samples No. 9, No. 10, and No. 20, a profile similar to that as found in FIG. 4(b) was obtained, although there was a slight difference in peak intensity ratio. In other samples, as is the case with FIG. 4(a), no peak appeared at wavelengths ranging from 700 to 1000 nm.

REFERENCE SIGNS LIST

1: Dielectric layer
2: Conductor layer (Internal electrode)
3: External electrode

The invention claimed is:

1. A dielectric material having a rutile crystalline structure, comprising:
   Ti as a major constituent metal element; and
   as metal elements other than Ti, a metal element M1 which includes at least one selected from among Ni, Co, and elements belonging to Group 2 according to a periodic table, and a metal element M2 which includes at least one selected from among elements belonging to Group 5 and Group 6 in the periodic table,
   on a basis of a total amount of Ti, the metal element M1, and the metal element M2, a molar ratio x of the metal element M1 being in a range of 0.005 to 0.025 and a molar ratio y of the metal element M2 being in a range of 0.010 to 0.050.

2. The dielectric material according to claim 1, wherein, in a cathode luminescence spectrum, an intensity I1 of a peak which appears at wavelengths ranging from 400 to 600 nm is greater than an intensity I2 of a peak which appears at wavelengths ranging from 700 to 1000 nm.

3. The dielectric material according to claim 1,
wherein the metal element M1 includes at least one of Mg, Ni, and Co, and the metal element M2 includes at least one of Nb and Ta.

4. The dielectric material according to claim 1,
wherein the metal element M1 is Ca, and the metal element M2 is W.

5. The dielectric material according to claim 3,
wherein the molar ratio x falls in a range of 0.008 to 0.018, and the molar ratio y falls in a range of 0.016 to 0.036.

6. The dielectric material according to claim 1,
wherein a relative permittivity at 1 kHz is greater than or equal to 1000, and a dielectric loss is less than or equal to 0.5.

7. The dielectric material according to claim 1,
wherein a porosity is less than or equal to 5%.

8. An electronic component comprising:
a dielectric layer; and
a pair of conductor layers which are opposed to each other with the dielectric layer interposed in between,
the dielectric layer being formed of the dielectric material according to claim 1.

9. The electronic component according to claim 8, comprising a plurality of dielectric layers; and
a plurality of conductor layers,
wherein the plurality of dielectric layers and the plurality of conductor layers are alternately laminated.

10. The dielectric material according to claim 4,
wherein the molar ratio x falls in a range of 0.008 to 0.018, and the molar ratio y falls in a range of 0.016 to 0.036.

* * * * *